(12) United States Patent
Billmaier et al.

(10) Patent No.: US 8,807,033 B2
(45) Date of Patent: Aug. 19, 2014

(54) PRINT CONTROL STRIP FOR COLOR MEASUREMENT ON PRINTING MATERIAL, MEASURING METHOD AND METHOD OF METERING INK

(75) Inventors: Stefan Billmaier, Walldorf (DE); Bernd Wenzel, Dielheim (DE)

(73) Assignee: Heidelberger Druckmachinen AG, Heidelberg (DE)

( * ) Notice: Subject to any disclaimer, the term of this patent is extended or adjusted under 35 U.S.C. 154(b) by 0 days.

(21) Appl. No.: 13/313,745

(22) Filed: Dec. 7, 2011

(65) Prior Publication Data

US 2012/0073464 A1 Mar. 29, 2012

Related U.S. Application Data

(62) Division of application No. 12/145,950, filed on Jun. 25, 2008.

(30) Foreign Application Priority Data

Jun. 25, 2007 (DE) .......................... 10 2007 029 211

(51) Int. Cl.
*B41F 31/02* (2006.01)
*B41F 33/10* (2006.01)

(52) U.S. Cl.
USPC .... 101/484; 10/365; 10/DIG. 45; 10/DIG. 47

(58) Field of Classification Search
CPC ............. B41F 33/0027; B41F 33/0036; B41F 33/0045; B41P 2233/50; B41P 2233/51; B41P 2233/52

USPC .................. 101/481, 483, 484, 485, DIG. 45, 101/DIG. 47, 365

See application file for complete search history.

(56) References Cited

U.S. PATENT DOCUMENTS 4,852,485 A * 8/1989 Brunner ........................ 101/211
4,947,746 A * 8/1990 Jeschke et al. ................ 101/211

(Continued)

FOREIGN PATENT DOCUMENTS

| CN | 2881608 Y | 3/2007 |
| DE | 3604222 A1 | 9/1986 |

(Continued)

OTHER PUBLICATIONS

German Search Report dated Nov. 8, 2007.

(Continued)

*Primary Examiner* — Judy Nguyen
*Assistant Examiner* — Leo T Hinze
(74) *Attorney, Agent, or Firm* — Laurence A. Greenberg; Werner H. Stemer; Ralph E. Locher

(57) ABSTRACT

A print control strip to be applied to printing material during a multicolor printing process, includes multiple measuring fields associated with one ink zone on the printing material. The measuring fields, which are associated with one ink zone, include at least two gray measuring fields. A method of measuring measuring fields in print control strips on printing material with a measuring device and a control unit connected thereto, and a method of controlling metering of ink in offset printing presses including at least one ink metering device in each printing unit and a control unit, are also provided.

4 Claims, 2 Drawing Sheets

(56) References Cited

U.S. PATENT DOCUMENTS

| | | | |
|---|---|---|---|
| 5,636,330 A * | 6/1997 | Barak | 358/1.9 |
| 5,957,049 A | 9/1999 | Ammeter et al. | |
| 7,398,733 B2 | 7/2008 | De Vries et al. | |
| 2005/0134872 A1 | 6/2005 | Maki | |
| 2007/0079717 A1 * | 4/2007 | De Vries et al. | 101/484 |

FOREIGN PATENT DOCUMENTS

| | | | |
|---|---|---|---|
| DE | 3643721 A1 | 6/1988 |
| DE | 3909410 A1 | 9/1990 |
| DE | 4319044 A1 | 12/1994 |
| DE | 4338976 A1 | 5/1995 |
| DE | 19638967 A1 | 4/1998 |
| DE | 102004044763 A1 | 3/2006 |
| EP | 0518559 A1 | 12/1992 |
| EP | 0649743 A1 | 4/1995 |
| EP | 1275502 A1 | 1/2003 |
| JP | 9300590 A | 11/1997 |
| JP | 2000127348 A | 5/2000 |
| JP | 2001080128 A | 3/2001 |
| JP | 2006123419 A | 5/2006 |
| JP | 2006231558 A | 9/2006 |
| WO | 2005108084 A1 | 11/2005 |

OTHER PUBLICATIONS

Chinese Office Action dated Nov. 5, 2010. English Translation.

* cited by examiner

PRINT CONTROL STRIP FOR COLOR MEASUREMENT ON PRINTING MATERIAL, MEASURING METHOD AND METHOD OF METERING INK

CROSS-REFERENCE TO RELATED APPLICATION

This application is a divisional of copending patent application Ser. No. 12/145,950, filed Jun. 25, 2008; this application also claims the priority, under 35 U.S.C. §119, of German Patent Application DE 10 2007 029 211.4, filed Jun. 25, 2007; the prior applications are herewith incorporated by reference in their entirety.

BACKGROUND OF THE INVENTION

Field of the Invention

The present invention relates to a print control strip to be applied to printing material during a multicolor printing operation. The print control strip includes multiple measuring fields which are associated with an ink zone on the printing material. The present invention also relates to a method of measuring the print control strip and to a method of controlling the metering of ink in offset printing presses based on color measurements on the print control strip.

The quality of a printing operation is measured by evaluating to what extent the printed products conform to the original. A high degree of conformity between the colors of the printed product and the original is an important aspect of print quality. The operator may evaluate the quality of the printed products by visual inspection. In that case, the inspection is subjective and depends on the person who makes the inspection. In order to provide a more objective approach to quality control, color measuring devices have been developed, which measure the printed products in colorimetric or densitometric terms. In most cases, however, it is not the entire printed image that is being measured, because that would require a plurality of measuring locations and would thus be a very time-consuming process. Instead, it is common to use the color measuring devices to measure what are known as print control strips. Those print control strips are located outside the printed image in the lateral region of the printing material. They may even be measured in the printing press through the use of integrated color measuring devices because only a limited number of color measurements need to be taken on the print control strips, making precise measurements possible even at the high printing speeds of approximately 18,000 sheets per hour, which are common in modern offset printing presses. Such a print control strip is known from German Published, Non-Prosecuted Patent Application DE 36 43 721 A1, corresponding to U.S. Pat. No. 4,947,746. Such a print control strip for controlling the printing process includes several color fields of different color and structure disposed in a row and distributed in a manner corresponding to the ink zones of the ink fountain in an offset printing press. The printing colors that are used in the printing process are in general included as solid-tone and halftone fields in the print control strip. The print control strip described in German Published, Non-Prosecuted Patent Application DE 36 43 721 A1, corresponding to U.S. Pat. No. 4,947,746, has alternating solid-tone fields and continuous-tone fields for each color and single-color screen fields for each color. The print control strip described in German Published, Non-Prosecuted Patent Application DE 36 43 721 A1, corresponding to U.S. Pat. No. 4,947,746, includes a gray measuring field on each border between two ink zones. However, an optimum control of the color according to those few gray measuring fields is impossible.

SUMMARY OF THE INVENTION

It is accordingly an object of the present invention to provide a print control strip, a measuring method and a method of metering ink, which overcome the hereinafore-mentioned disadvantages of the heretofore-known devices and methods of this general type and which provide improved ink control on the basis of gray measuring fields.

With the foregoing and other objects in view there is provided, in accordance with the invention, a print control strip to be applied during a multicolor printing operation to printing material having ink zones. The print control strip comprises multiple measuring fields associated with an ink zone on the printing material. The measuring fields associated with one ink zone include at least two gray measuring fields.

With the objects of the invention in view, there is also provided a method of controlling metering of ink in offset printing presses having printing units, at least one ink metering device in each printing unit, and a control unit. The method comprises measuring a measuring strip including a plurality of gray measuring fields within an ink zone on a printed product, with a color measuring device, feeding measured gray values to the control unit for controlling the metering of the ink in the printing units, and calculating nominal values for controlling the metering of the ink in the printing units with the control unit and transmitting the nominal values to the printing units.

With the objects of the invention in view, there is furthermore provided a method of measuring measuring fields in print control strips on printing material. The method comprises providing the measuring fields in at least two rows in the print control strips, providing each measuring field at least once in each row of the print control strips, measuring the measuring fields with a measuring device to provide measured values, and subjecting the measured values, during the measuring step, to a plausibility check in a control unit connected to the measuring device.

In accordance with the present invention, print control strips which contain several measuring fields associated with an ink zone on the printing material are printed onto the printing material in the printing press. In order to improve the control based on gray measuring fields, the measuring fields associated with one ink zone include at least two gray measuring fields. Thus, it is possible to obtain multiple measured gray values for each ink zone, with each gray measuring field being composed of the colors cyan, magenta, and yellow. Multiple gray levels can be determined in each ink zone by providing several gray measuring fields per ink zone. The gray values which have been measured in densitometric or colorimetric terms by the color measuring device may then be fed to the control unit of the printing press. The control unit may then compare the measured gray values to measured color values of the original. If there are unacceptable deviations, the control unit may calculate a correcting variable to control the ink metering device in the printing units of the printing press. If the printing units include zonal ink metering devices, the present invention provides multiple measured gray values for control purposes. This increases the accuracy of the ink metering in the ink zones. In addition to the gray measuring fields, the print control strip may include the usual color measuring fields such as the solid tones of cyan, magenta and yellow, as well as black and potential special or spot colors. Furthermore, the individual colors may also be available as halftone fields between zero and 100 percent.

In accordance with another particularly advantageous feature of the invention, the measuring fields associated with one ink zone may include three gray measuring fields. The more gray measuring fields that are present, the more accurately the ink may be metered in each ink zone. In particular, due to the provision of three gray measuring fields in 25% continuous tone, 50% continuous tone, and 75% continuous tone for the three basic process colors cyan, magenta and yellow, particularly accurate color measurement and ink control are possible. Thus, it is possible to provide accurate ink control even for highly complicated print jobs.

In accordance with a further feature of the invention, the measuring fields may be disposed in at least two parallel rows. The print control strips that have been known heretofore are formed of one row of measuring fields, which are repeated to match the number of ink zones. Due to the configuration of the color measuring fields in two or more rows, the color measuring fields are redundant in each ink zone. Thus, the operator receives more information for the color measurement and ink control in each ink zone. The redundant information in each ink zone also provides a possibility to realize the presence of measuring errors resulting from printing problems such as ghosting, hickeys, or the accumulation of powder during the printing process in the printing press. Thus, color measurement and ink control or metering become more reliable.

In accordance with an added feature of the invention, each measuring field of the first row is present at least once in each of the other rows. In this case, the color measuring device measures two measuring fields of the same type in each ink zone. Thus, a twofold color measurement for each measuring field in each ink zone is possible. The control unit of the printing press may then evaluate the measured values which have been obtained in this way in terms of plausibility. If the measured values of identical measuring fields in one ink zone differ beyond an acceptable tolerance, the assumption is that there are printing problems in that particular ink zone which make the measured values inconclusive. In this case, the control unit assumes that the values are implausible, and the ink metering device for the relevant ink zone may instead be controlled on the basis of the measured values of an adjacent ink zone. The measured values of the adjacent zones may at least be used to determine to what extent the measured values in the ink zone which have been established as erroneous need to be corrected.

In accordance with an additional feature of the invention, which improves the conclusiveness of the measured values, the order of the measuring fields in the rows is different. This avoids local printing problems such as hickeys or powder accumulation in locally limited specific areas on a measuring field affecting all measuring fields of the same type in an ink zone. Due to the different order of the measuring fields, measuring fields of the same type in one ink zone are disposed at different locations, a fact which means that printing problems which are locally limited do not cause all measuring fields of the same type to be considered useless. Through the use of the measured values for the adjacent measuring fields, the control unit of the printing press may be able to decide which of the measuring fields of the same type in the ink zone in question most probably is the correct measuring field. In this context, it is sufficient for measuring fields of the same type to be present only once in each ink zone. Due to the configuration in two or more rows, the redundancy required for reliable color measurement is ensured without requiring the multiple-row print control strip to have too many measuring fields per ink zone. Since the width of the ink zone is given and invariable, an unnecessarily high number of measuring fields per ink zone leads to correspondingly small measuring fields which make an accurate color measurement more difficult.

In accordance with yet another feature of the invention, only one gray measuring field is present in each ink zone, but the advantages of a print control strip which has two or more rows is still exploited. In this case, the gray measurements will be less accurate than if several gray measuring fields were present, but the improvement of the reliability of the measurement due to the redundancy of the measuring fields in the multi-row print control strip is advantageous even if the multi-row print control strip does not have more than one gray measuring field.

In accordance with a concomitant feature of the invention, the evaluation of the gray measuring fields through the use of the computer may be influenced through an input device before the measurement of the gray measuring fields is taken through the use of a color measuring device. If more gray measuring fields are provided in each ink zone, the evaluation thereof may be adapted to the specific conditions of the print job. Thus, knowing the specific conditions of the print job, the operator may select gray measuring fields in a job-specific way on the control unit of the printing press through the use of a user interface and input devices such as a keyboard, mouse, or touch screen. For example, the operator may select to control the ink only based on the 25% continuous tone or based on the 50% continuous tones and 75% continuous tones of the gray measuring fields. If mostly 25% continuous tones are present in a gray area in a printed image, the best possible control result for the metering of the ink is achieved if the individual ink zones are controlled on the basis of the measured gray values of the 25% continuous-tone gray measuring field. In this case the control suggestions for 50% continuous tone and 75% continuous tone gray measuring fields should be suppressed. Thus, measuring all gray measuring fields with the same weighting, the control quality compared to a control based on average color values would be considerably improved. However, the default settings for the ink control in the computer may be that the measured gray values are introduced in the control of the ink-metering printing units as an average value. A job-specific ink control based on the selected gray measuring fields is only implemented when the operator expresses his or her wish to do so by the appropriate inputs on the control computer through a suitable input menu. This provides more options to the operator to adapt ink control to the specific conditions of a print job without losing the advantages of a default control based on averaging the measured gray values.

Other features which are considered as characteristic for the invention are set forth in the appended claims.

Although the invention is illustrated and described herein as embodied in an improved print control strip for color measurement on printing material, a measuring method and a method of metering ink, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
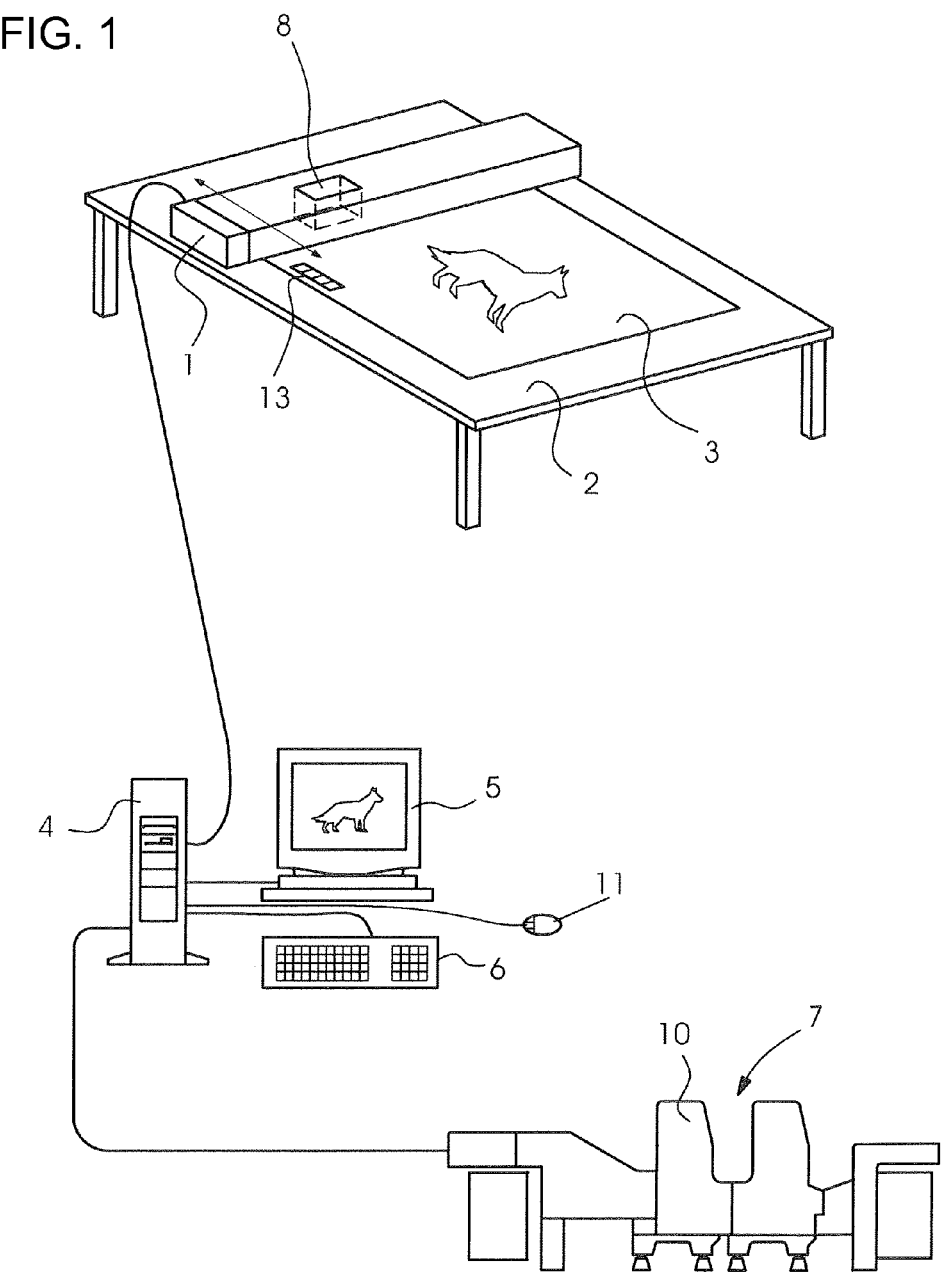
FIG. 1 is a diagrammatic, partly perspective and partly elevational view of a closed ink control loop formed of a color measuring device, a control unit and an ink metering device in a printing press.

Referring now to the figures of the drawings in detail and first, particularly, to FIG. 1 thereof, there is seen an ink control loop which includes a color measuring device 1, a control unit 4 and an ink metering device in printing units 10 of a printing press 7. The aforementioned devices 1, 4, 7 are connected to each other through electronic communication lines. The color measuring device 1 shown in FIG. 1 is a standalone color measuring device which includes a measurement table 2 for receiving printed products 3. Instead of such a standalone ink measuring device 1, an inline ink measuring device, which is integrated into the printing press 7, may be used to measure the printed products 3 in the printing press 7, preferably at the outlet of the last printing unit 10. The standalone ink measuring device 1 shown in FIG. 1 includes a measuring bar which is movable across the printed product 3 in the longitudinal direction, and an ink measuring head 8 which is movable across the printed product 3 in the transverse direction to measure each point on the printed product 3 in colorimetric terms. As can be seen in FIG. 1, a print control strip 13 is present next to the printed image on the printed product 3. This print control strip 13 is located in the lateral region of the printed product 3. In order to shorten the measuring process, only the measuring fields of the print control strip 13 need to be scanned by the color measuring device 1. Measured values established by the color measuring device 1 are then fed to the control unit 4, which may be a standalone computer or an integral part of a control unit of the printing press 7. The control unit 4 compares the measured color values to predetermined measured values of the original. For this purpose, the original may have been stored in the control unit 4 in digitized form, or the control unit 4 may be given the opportunity to access relevant data in a prepress department. If the control unit 4 realizes deviations beyond a certain tolerance between the data of the original and the measured values, the established deviations are converted into control values for the metering device in the printing units 10 of the offset printing press 7. The control values which have been calculated in this way are then transmitted to the printing press 7, where they are translated into corresponding modifications, for example, of an ink zone opening in ink-zone inking units in the printing units 10. In this way, the control loop between the color measuring device 1 and the printing press 7 is closed. For display and input purposes, the control unit 4 includes a screen 5 and input devices such as a mouse 11 and a keyboard 6 for the operator to influence the control loop of the ink metering device. Thus, the operator may use the mouse 11 or keyboard 6 to select the way to evaluate the print control strip 13 in the control unit 4. For example, the operator may decide whether to evaluate all measuring fields of the print control strip or to evaluate only specific measuring fields which are relevant for the current print job.

Figure 2:
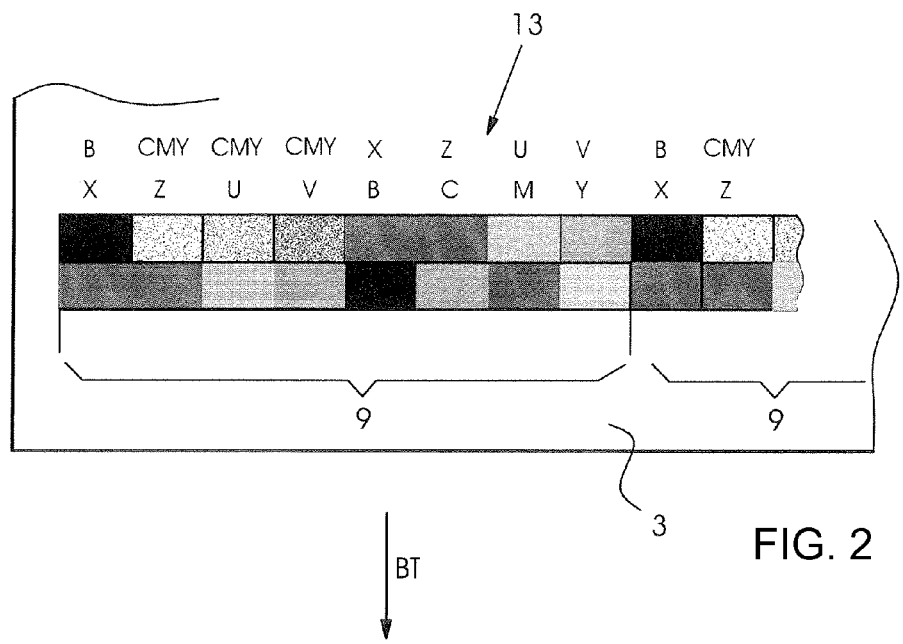
FIG. 2 is a top-plan view of a double-row ink control strip including multiple gray measuring fields in one ink zone.
Figure 3:
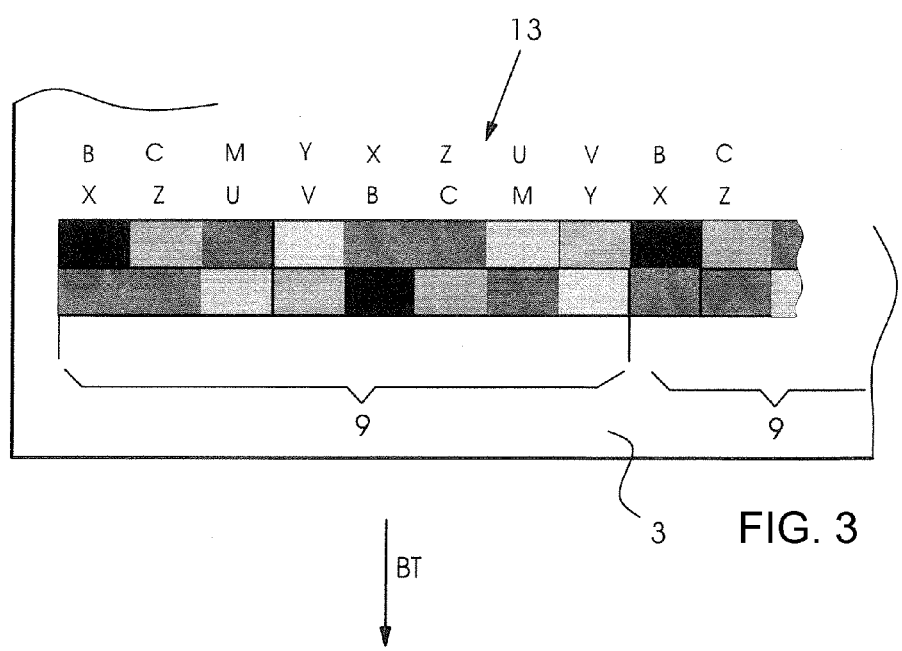
FIG. 3 is a top-plan view of a double-row ink control strip with redundant measuring fields in one ink zone.

FIGS. 2 and 3 illustrate an enlarged view of the print control strip 13 provided on the printed product 3. What is shown is a section of the lateral region of the printed product 3. The print control strip 13 is shown in FIGS. 2 and 3 for one ink zone 9. This ink zone 9 repeats itself in a direction transversal to a direction of transport BT of the printed product across the entire width of the printed product 3. In the 102 sheet format, 32 ink zones 9 are usually present adjacent each other in one row. There may be gaps or additional measuring fields for register control, for example, between the individual ink zones 9. Thus, the print control strip 13 is not exclusively limited to color measurement, but may be used for other control loops as well. The print control strip 13 shown in FIG. 2 has several gray measuring fields CMY in each ink zone 9. These gray measuring fields CMY are in different tones. The gray measuring fields CMY in FIG. 2 are embodied as 25% continuous tone, 50% continuous tone, and 75% continuous tone in each ink zone 9. The gray measuring fields CMY are only present in the upper row, which also includes the color black B and special or spot colors X, Z, U, V. The lower row likewise includes the special or spot colors X, Z, U, V and the color black B as well as the colors cyan C, magenta M and yellow Y instead of the gray measuring fields CMY. All of the measuring fields can be scanned by the color measuring device 1, which can then transmit the measured values to the control unit 4 for ink control purposes. The color values that have been measured in this way will then be used to control the ink metering devices in the printing units 10 of the offset printing press 7.

The print control strip 13 shown in FIG. 3 likewise includes two rows. Each measuring field present in one ink zone 9 is provided twice. Thus, the color black B, the colors cyan C, magenta M and yellow Y as well as the spot colors X, Z, U, V are present both in the upper row and in the lower row of the print control strip 13. Furthermore, the order of the measuring fields of one ink zone 9 in the upper row and in the lower row is different so that measuring fields of the same type are not directly above each other. If a measuring field is not to be evaluated due to printing problems, the redundant measuring field can be evaluated correctly in the case of locally limited printing errors by carrying out a plausibility check in the control unit 4 for the different color values which have been measured for the same measuring field. Measured values of neighboring ink zones 9 may be considered in the plausibility check. Of course, it is possible to integrate the gray measuring fields CMY which are known from FIG. 2 in the print control strip of FIG. 3, for example by replacing the spot colors X, Z, U, V by gray measuring fields CMY if no spot colors are being used. However, if spot colors are used nevertheless, the number of the measuring fields for one ink zone needs to be increased in a corresponding way. This, however, would reduce the size of the measuring fields due to the predetermined width of the ink zone 9. Since the measuring fields in FIG. 3 are redundant due to the two-row configuration, the reduction in size of the measuring fields does not cause the same deteriorations as in the known one-row structure of a print control strip 13. Moreover, in the case of only slight deviations between measuring fields of the same type in the top and lower row of the print control strip 13, the measured values can be averaged in the control unit 4 and the average value may be used to calculate the control values in the ink metering devices of the printing units 10 of the offset printing press. Thus, it is possible to avoid slight differences caused, for example, by ghosting.

The invention claimed is:

1. A method of controlling metering of ink in offset printing presses having printing units, at least one ink metering device in each printing unit, and a control unit, the method comprising the following steps:

measuring a measuring strip including a plurality of gray measuring fields in different continuous tones within an ink zone on a printed product, with a color measuring device, the gray measuring fields being disposed in at least two parallel rows, each gray measuring field present in a first row of the at least two parallel rows being present at least once in each further row of the at least two parallel rows;

feeding measured gray values to the control unit for controlling the metering of the ink in the printing units;

calculating nominal values for controlling the metering of the ink in the printing units with the control unit and transmitting the nominal values to the printing units; and controlling the metering of the ink in the printing units based upon the nominal values.

2. The method according to claim 1, which further comprises influencing an evaluation of the gray measuring fields with the control unit through an input device, prior to the step of measuring the gray measuring fields with the color measuring device.

3. The method according to claim 2, which further comprises controlling the ink metering devices in the printing units of the printing press with the control unit in dependence on selected gray measuring fields.

4. The method according to claim 1, which further comprises introducing the measured gray values as average values in the control of the metering of the ink in the printing units, for ink control by the control unit.

* * * * *